United States Patent Office 3,803,278
Patented Apr. 9, 1974

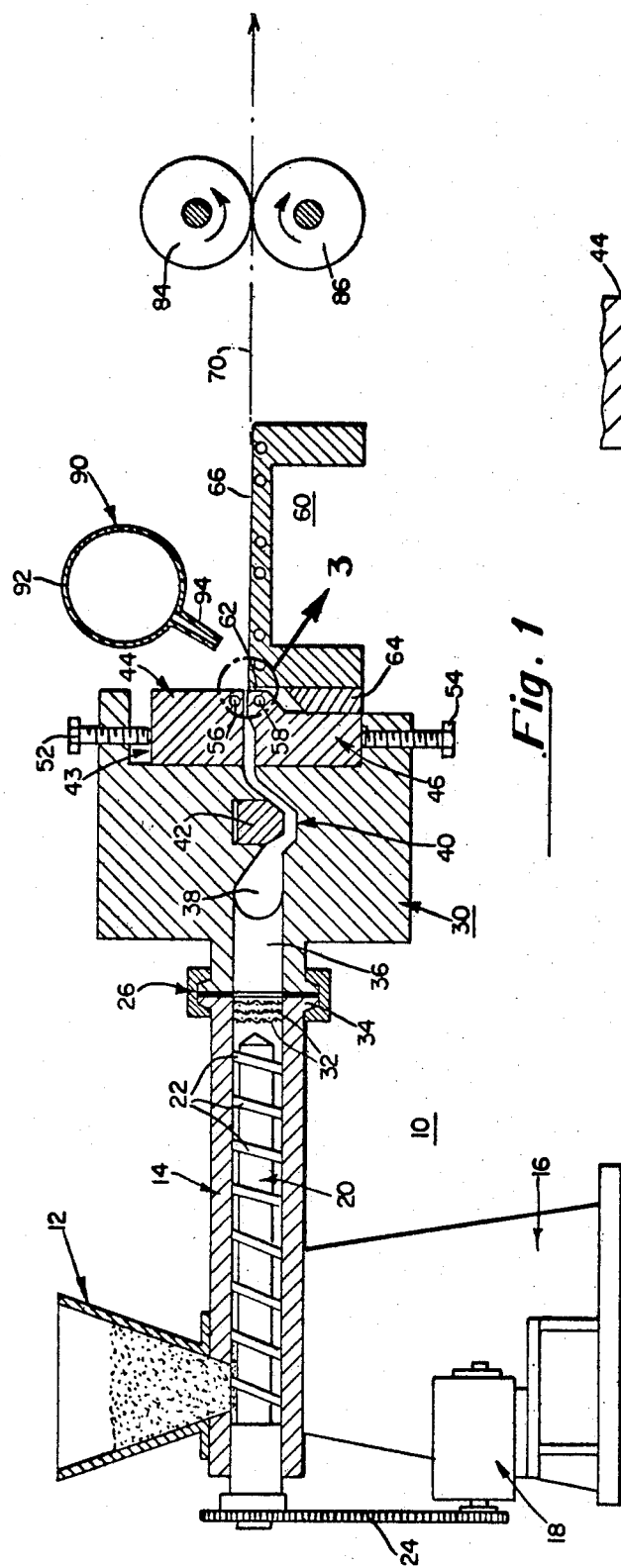
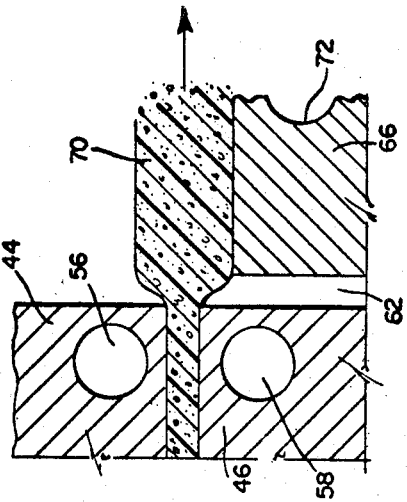
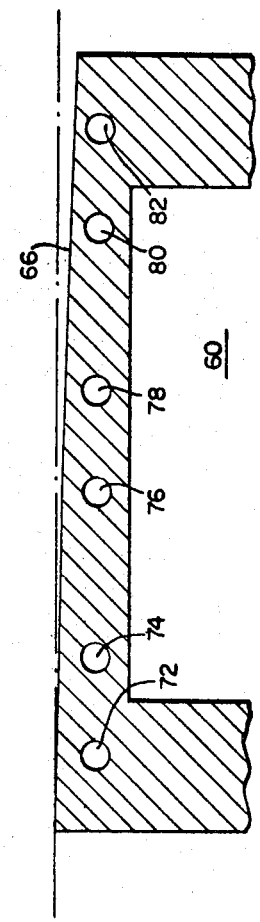

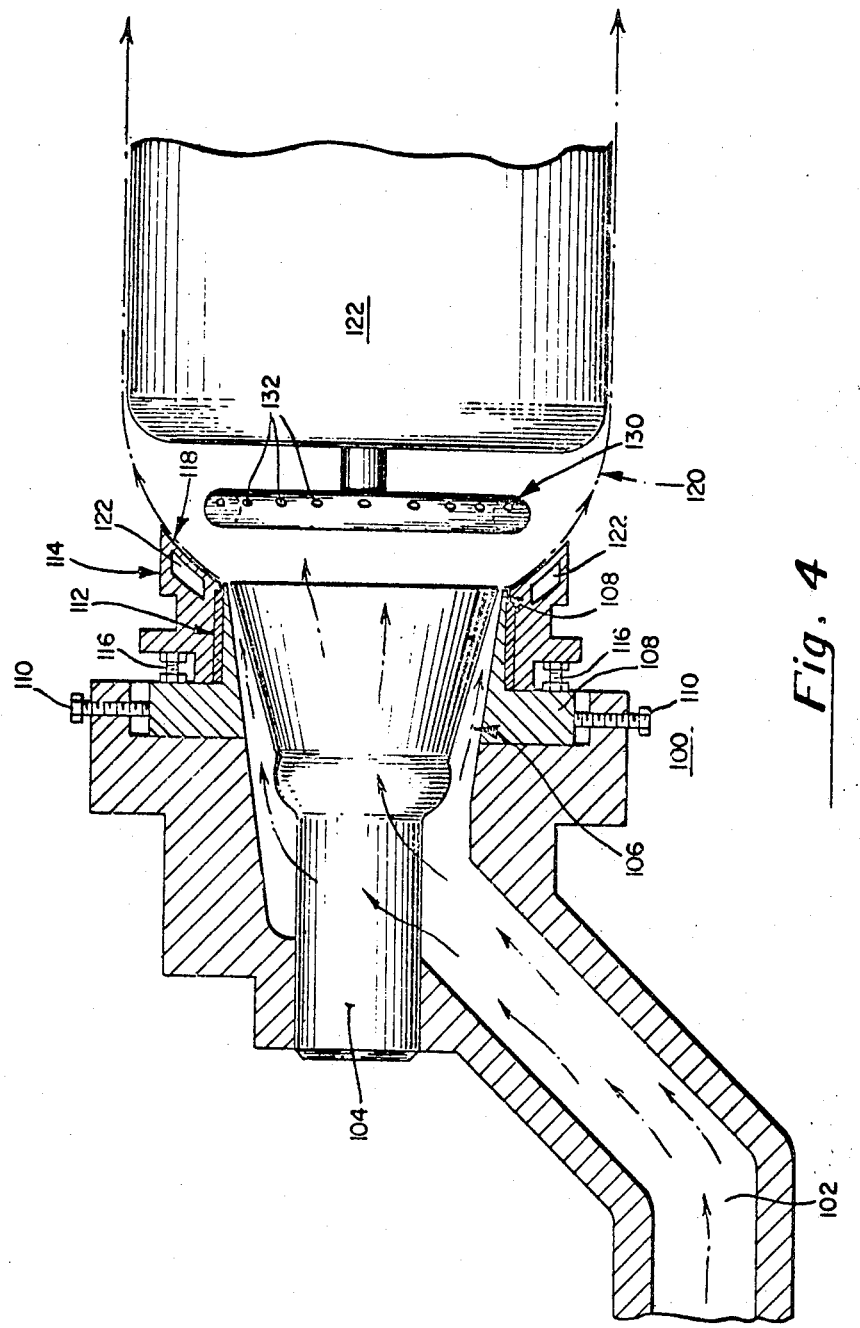

3,803,278
DEEP-DRAWABLE POLYSTYRENE FOAM SHEETS
James J. Eberl, 7 Rose Hill Road, Moylan, Pa. 19065;
David J. Kelly, 29 Weather Vane Road, Aston, Pa.
19014; Albert L. McConnell, 210 Governors Drive,
Wallingford, Pa. 19086; Laurance E. Norton, 712
Douglas Drive, Cherry Hill, N.J. 08034; and Gordon
E. Wade, 15 Highpoint Drive, Glen Riddle, Pa. 19013
Continuation of abandoned application Ser. No. 752,295,
Aug. 13, 1968. This application June 12, 1970, Ser.
No. 45,916
Int. Cl. B29d 27/00
U.S. Cl. 264—48
5 Claims

ABSTRACT OF THE DISCLOSURE

Apparatus for producing thin sheets of polystyrene foam including a rigid, fixed, thermally conductive, substantially linear surface extending in the direction of machine feed immediately proximate and spaced from, in an insulated manner, the extruder die lips. Process for producing thin sheets of polystyrene foam by exiting a heated melt at a pressure of at least 380 p.s.i. into a thermally uncontrolled ambient at atmospheric pressure without restraining vertical growth of the melt, and immediately supporting said polystyrene against a rigid, substantially linear supporting surface without deforming the foam sheet while contemporaneously cooling said surface to cool the face of said foam which is in contiguity with said surface.

CROSS-REFERENCES TO RELATED APPLICATIONS

This application is a continuation of application Ser. No. 752,295, filed Aug. 13, 1968, now abandoned, and titled "Apparatus and Process for Producing Polystyrene Foam Products."

BACKGROUND OF THE INVENTION

This invention relates to an apparatus for producing relatively low density, polystyrene foam which may be readily deep drawn under commercial process conditions, while retaining the cellular structure of the foam without destroying the physical integrity of the foam sheet or the insulating character of the cellular foam, and to the process whereby such a foam product is produced. The invention also includes the unique polystyrene sheeting which is produced by the foreging process.

In the art of producing polystyrene foam sheeting which is subsequently formed by deep draw processes into three dimensional objects, various types of dies may be utilized to produce the sheeting. In the so-called "T-die" process, the polystyrene melt is extruded from the barrel of a conventional extruder through a rectangular slit or die opening having a very extensive width, and a very limited height. The product which exits the T-die is a planar sheet. The alternative die construction which may be utilized is the so-called "ring die." In the ring die, the melt from the barrel of the extruder is forced between a frusto-conical plug and a substantially complementary frusto-conical aperture in the die body, so that the foam exits in the form of a continuous hollow tube. The hollow tube is slit at diametrically opposed points, so that two planar sheets are produced. The instant process and apparatus are applicable to both T-die and ring-die foam apparatus and processes.

Broadly, the apparatus of this invention comprises a rigid, substantially linear cooling surface, spaced downstream of the lips of the extruder die and extending in the direction of feed of the polystyrene sheeting. The linear surface is spaced below and immediately proximate the die lips, but is insulated therefrom, the surface being maintained at such a temperature that, when the surface is in intimate contact with the sheeting being extruded, the surface serves to support the sheeeting, without deforming the same, and to cool the sheeting by withdrawing heat therefrom, to permit the formation of a dense layer or skin of polystyrene resin at the surface of the foam sheet which is in contiguity with the aforesaid rigid cooling surface.

The process of the invention includes the extrusion of a polystyrene foam melt from an extruder die into a thermally uncontrolled (no avoidable addition of heat immediately at the die exit) atmosphere, wherein the extrudate exits from a high pressure zone into an atmospheric pressure ambient, and wherein vertical growth of the extruded sheeting is unhindered. Immediately thereafter, the extruded foam sheeting makes contact with a rigid, substantially linear surface which is maintained at a temperature at least 150° F. below the extrudate temperature, whereby said polystyrene sheeting is cooled, and a dense skin of polystyrene is formed at the surface which contacts the aforesaid rigid surface.

In the process and apparatus of this invention, as they apply to T-die foam, the die lips of the T-die may themselves be cooled so that the melt is slightly cooled, immediately prior to its exit from the lips of the T-die. In a modification of the invention for the production of relatively low density foam, cool air, supplied from an air knife or the like, is blown against the face of the sheeting which opposes to the face in contact with the rigid, linear cooling surface, impingement of cooling air commencing at substantially the same point at which the foam sheeting commences to be supported by the rigid surface.

Polystyrene foam, because of its high insulating property, produced by the cellular nature of the foam with entrapped gases therein, and because of the relative structural strength of the foam, has recently met with considerable interest as a material for the production of insulated utensils, such as hot drink cups. However, the polystrene foam is relatively fragile, and cannot readily withstand the extreme forces which occur when the foam is subjected to high speed, mass production, deep drawing and lip rolling processes, such as are encountered when insulated hot drink cups are being produced. As used herein, the term "deep draw" technique is used to denote production techniques wherein the depth of the finished article being formed is one or more times the maximum width of the finished article being formed, the article in question being formed from a planar sheet by the application of differential forces to opposing faces of the planar sheet. Such deep draw processes, which are well known in the art, require that the sheet be in an initial heated condition prior to deformation, to render the same deformable under the forces of thermo-forming, and the forming processes involve the use of at least a female mold and positive air pressure or vacuum to cause the sheet to assume the configuration of the female mold. In some techniques a male mold element is used in conjunction with the female mold element for the formation of the object in question. It is well known in the art that combinations of these deforming conditions may exist, such as using male and female mold elements with vacuum or pressure assist.

In addition to the problems involved in high speed formation of deep-drawn polystyrene foam articles, such as maintaining cellularity and avoiding cracking of the product, manufacturing tolerances may be extremely important, particularly when the foam hot cups are to be utilized in vending machines, which are relatively sensitive instruments. These vending machines may jam if cups having dimensions exceeding certain stringently specified dimensional tolerances are utilized in the machine. Such jamming requires servicing by a vending machine company serviceman, which can be quite expensive, and is therefore highly undesirable.

Moreover, in producing polystyrene foam at high speeds, it is extremely important to achieve dimensional and structural uniformity of the foam. That is to say, the foam should be of substantially uniform thickness throughout its cross-section, and the cellular character of the foam, or the density thereof, should also be substantially uniform throughout the cross-section thereof, to provide uniform end products. Also, due to the relative fragility of polystyrene foam exiting the extruders which are used for the production thereof, many problems can arise which are inherent in the manufacture of such a fragile material at high speeds. The most serious of such problems is known as corrugation. In the formation of polystyrene foams for deep-drawing processes, it is conventional to place a skin of polystyreen material on both surfaces of the foam sheeting. The skin is produced by cooling the polystyrene foam sheeting at its surfaces. In the prior art, such expedients as the use of rotating, deforming, cooling rolls, as shown in Aykanian et al. Pat. No. 2,905,972, or cooling hot air films, such as shown in Haveg Pat. No. 3,299,192, and American Can Pat. No. 3,311,681, have been utilized for the production of dense skins. However, considering the fragility of the material in question, and the high speeds utilized in production processes, these skins produce numerous production problems. Cooling rates are exceedingly critical, and if a surface or both surfaces are cooled at too great or too low a rate, differential contraction or expansion of the foam sheeting may occur and result in the phenomenon known as corrugation, wherein the foam takes a corrugated appearance in cross-section, losing its planar characteristic. These corrugated foams are virtually commercially unusable for deep-drawing process, for they will not permit the production of uniform products, to the high tolerances demanded in the foam cup industry.

The instant invention overcomes the foregoing disadvantages of the prior art. The invention constitutes an apparatus and a process for producing a polystyrene foam sheeting having a density of 45 lbs. per cubic foot or less, and the foam sheeting produced thereby. The foam sheeting of this invention has a uniform thickness and cellular structure, is substantially free of corrugation, will retain its cellular nature upon deep drawning, and can readily be formed into uniform, deep-drawn products having acceptable commercial tolerances, on high-speed industrial equipment. These advantages are provided in the apparatus by a substantially linear, extended die-lip construction, proximate the lip of the extruder die, but insulated therefrom, which extended die-lip is maintained at a temperature of at least 150° F. below the temperature of the polystyrene extrudate exiting the die. This apparatus may be utilized, with appropriate modifications, in T-die or ring-die extruding equipment. In a modification of the apparatus, in achieving relatively low density polystyrene foam, a quantity of cool air having a temperature of at least 100° F. below the melt temperature impinges on the opposite surface of the polystyrene sheeting from the surface which contacts the extended die-lip, at approximately the point at which the foam initially contacts the die lip. In a further modification of the invention with respect to T-die apparatus, the die-lips of the T-die itself may be provided with cooling means to further facilitate temperature control of the melt, and to insure optimum polystyrene foam characteristics.

The process, in its broadest sense, entails the extrusion of a polystyrene foam melt at a high pressure, such as 380 p.s.i., and high temperature, from the die of an extruding apparatus, into an ambient at an uncontrolled temperature and atmospheric pressure, without restraining the vertical growth of the extrudate, and immediately thereafter cooling the extrudate by contacting the same with a rigid, substantially linear surface insulated from the die lips and maintained at a temperature of at least 150° F. below the temperature of the extrudate. The invention also includes the novel, readily commercially formable polystyrene foam, having relatively low density, and having a thick skin on one surface, and a thin skin on the other surface.

It is therefore an object of this invention to provide an improved process for producing relatively thin sheets of polystyreen foam, free of corrugation, having substantially uniform thickness and cellularity throughout the cross-section and longitudinal dimensions thereof, which sheets may readily be formed by deep-drawing processes.

It is a further object of this invention to provide an improved apparatus for the accomplishment of the foregoing desiderata.

An additional object of this invention is to provide an apparatus containing a substantially linear, extended die-lip which is cooled with respect to the melt, and which is temperature-insulated from the die-lip.

Yet another object of this invention is to provide an apparatus and process for the precise, zoned temperature regulation of the extrudate in a polystyrene foam production process, to permit a high volume production process which produces superior foam sheeting of improved uniformity and forming characteristics.

A concomitant object of the invention is to provide an improved polystyrene foam product which may be readily formed into relatively low density, uniform, deep-drawn products, such as hot drink vending cups.

The foregoing and other objects of this invention will be understood when considered in conjunction with the appended drawings in which like reference numerals designate like parts, and in which:

FIG. 1 is a schematic representation, partly in section, of a T-die polystyrene foam extruding apparatus in accordance with this invention;

FIG. 2 is an enlarged sectional view of the extended die lip of FIG. 1;

FIG. 3 is an enlarged view of the area designated by numeral 3 in FIG. 1, showing the foam exiting the T-die lip;

FIG. 4 is an enlarged view, partly in section, similar to FIG. 1, of a ring die and related apparatus in accordance with another embodiment of this invention.

Referring to FIG. 1, there is shown an extruder unit, generally referred to by the numeral 10. The extruder unit comprises a hopper 12, a barrel 14, a base 16, and a drive motor 18. Located within the barrel 14 is an elongated screw 20 having screw threads 22 formed thereon. Screw 20 is rotatingly driven by motor 18, through belt drive means 24. The extruder is heated, at different temperatures in different sections along the length thereof, by suitable heating units (not shown) embedded in the barrel 14. The screw threads may be uniform along the length of the screw, or may be of different pitches (as shown) in different sections along the length of the screw, in order to provide different amounts and types of mechanical work and shear to contribute heat, pressure and agitation to the polystyrene. At the downstream end of the extruder, the extruder is fastened to the die unit by a coupler unit 26. The die unit will be generally referred to as 30.

The foregoing details of the extruder unit are well known in the art, and the details of the extruders which are usable with the apparatus and the process of this invention are of a sort which are well known in the art, and form no part of the instant invention.

Generally, in the production of polystyrene foam, polystyrene beads or pellets are fed into the hopper 12 of the extruder unit 10. Also fed into the hopper 12, in metered quantities, are suitable nucleating agents, which permit the formation of cells within the melt, and which may also, depending upon their chemical nature, break down into blowing gases for providing the cellularity of the foam. Many suitable nucleating agents are known in the art, such as the sodium bicarbonate, citric acid combination described in U.S. Pat. Nos. 2,941,964 and 2,941,965. If a separate blowing agent is desired, such blowing agents as pentane or Freon are conventionally utilized. The nucleating agents and blowing agents may be pre-impregnated into the individual polystyrene pellets, or they may be separately mixed with the polystyrene in the production process. In the instant process, it is more economical to separately introduce into the hopper metered amounts of polystyrene resin and the nucleating agents. If pentane or other volatile blowing agent is desired to be incorporated into the melt, it may be introduced into the extruder barrel at a suitable upstream inlet port (not shown) in a manner which is well known in the art, usually under a substantial amount of pressure.

In conventional processes for forming articles from sheets of polystyrene foam, a substantial amount of foamed polystyrene sheet scrap material which is not actually formed into usable objects is produced. In order for the commercial process to be economical, it is necessary to reintroduce this scrap material into the production process. Consequently, all scrap material is introduced into a granulator, and is ground down to a controlled particle size. The scrap is then combined with pellets of virgin polystyrene, in the hopper. A conventional combination of virgin and ground scrap polystyrene would be 60 percent virgin polystyrene and 40 percent ground scrap polystyrene. However, it will be appreciated that 100 percent virgin or 100 percent scrap polystyrene, or any intermediate combination thereof, may be used in any given process.

Commercial polystyrene will often have incorporated therein, a certain amount of styrene-butadiene-rubber, to provide resilience and toughness to the end product. The particular amounts of styrene-butadiene-rubber incorporated with the pure polystyrene are well known in the art, and commercial mixtures of polystyrene and the foregoing additives are generally commercially available.

The polystyrene and other additives from the hopper and, when appropriate, the blowing agent, are introduced into the barrel, are heated by the heating unit in the barrel of the extruder, and are mechanically worked by the screw in the extruder. In properly working the polystyrene foam, it is important to maintain proper temperatures and pressures in the various zones of the extruder barrel, but these pressures and temperatures will depend on the design of the particular extruder in question, the particular resin and blowing agent mix being utilized, and the control of these specific conditions is within the expertise of the skilled artisan, and forms no part of the instant invention.

It is to be noted that in producing a conventional polystyrene foam, having a density in the range from about 30 to about 40 lbs. per cubic foot, an amount in the range from about 0.15 to about 0.3 weight percent of each of sodium bicarbonate and citric acid would be used as hopper additives.

The coupler section includes several screens 32, which screens serve to effect a gross filtration of the polystyrene melt, to filter out any large foreign particles.

Referring to FIG. 1, extruder outlet section 34 communicates with an inlet channel 36 in the body of T-die 30. Channel 36 opens into a Y-shaped manifold section 38, of increasing width and decreasing thickness, which manifold section 38 serves to channel the relatively thin circular stream, in the range from about 1 to about 3 inches of molten polystyrene resin, which is introduced into the T-die, into the relatively wide and relatively thin configuration in which the molten stream is exited from the T-die. For example, conventional T-dies may have a width in the range of about 10 inches to about 84 inches, and may have a die lip gap in the range from about 10 mils to about 50 mils. After the melt is distributed in the manifold section, it passes through a tortuous choker section 40 in which a choker bar 42 is vertically adjustably mounted, by means of an adjusting screw (not shown) in a manner which is well known in the art. Adjustment of choker bar serves to effect a gross gauge control of the ultimate thickness of the melt which is being exhausted from the die. The downstream face of the die contains a recessed section 43 in which are mounted respective die lips 44 and 46. Die lips 44 and 46 are respectively vertically adjustable by means of screws 52 and 54, and this adjustability permits a fine adjustment of the gap between the die lips, thereby permitting gauge control of the ultimate thickness of the melt being extruded. As seen in FIG. 1, each of the respective die lips 44 and 46 is provided with a single bored conduit passing through the transverse dimension thereof, respectively designated as 56 and 58. Conduits 56 and 58 extend substantially throughout the entire transverse dimension of the die lips, and serve to permit flow of heated oil, which performs a cooling function with respect to the melt passing through the die lips. Heated oil is circulated through channels 56 and 58, supplied by a suitable pump (not shown), a single pump being satisfactory to supply both channels if desired. The temperature in channels 56 and 58 is maintained at a relatively high level, on the order of 350° F., but this temperature is always maintained at about at least 100° F. below the temperature of the melt entering the die lip. Consequently, even though the oil itself is heated, since the oil is at a lower temperature than the die melt, the oil performs a cooling function, heat being transferred from the melt to the die lips. The die lips are preferably formed of steel, but may be formed of any other high conductivity material, such as aluminum.

The purpose of the cooling of the die lip is to effect a slight cooling of the extrudate, and to prevent shock cooling of the melt as the sheet exits from the high pressure zone in the die lip, at a pressure of, for example, 380 p.s.i., and a temperature in the range from about 300° F. to about 400° F. to the relatively low temperature, atmospheric pressure ambient outside the die lip. Immediately downstream of the die lip is an extended die lip 60 which is fixedly mounted by mounting means (not shown), and is separated from lower die lip 46 by an air gap 62. The air gap 62 is maintained by virtue of transversely spaced insulating spacer members 64 which are formed of an insulating material, such as asbestos or Synthane. The extended die lip 60 has a slightly curved upper surface 66, as best seen in FIG. 2. The radius of curvature of the upper surface 66 is 4 feet in the preferred embodiment, in which the die lip is 11 inches in longitudinal dimension. The difference in elevation between the upstream and downstream edges of curved upper surface 66, on an 11 inch longitudinal dimension, with the aforesaid 4 foot radius of curvature, is about ¼ inch. Although not critical, it is extremely desirable to provide a slightly uniformly curved surface 66, rather than a planar surface, in order to enable the foam sheet 70 to conform accurately and completely to the upper surface of the extended die lip, in order that optimum heat transfer from the foam sheet to the die lip may be obtained. The particular radius of curvature of a given extended die lip will vary, depending on the length of the die lip. The curvature will always be uniform and slight, to permit the foam sheet to maintain its intimate contact with the extended die lip, along its entire length.

The extended die lip is bored transversely with a multiplicity of channels, respectively designated 72 and 74, 76 and 78, and 80 and 82. These channels extend substantially throughout the entire transverse dimension of the extended die lip, and as shown in FIG. 2 are uniformly spaced in pairs. Each respective pair of channels is circulated with heated liquid, preferably water, to provide the cooling of the sheet which occurs when the sheet contacts the extended die lip, each pair of channels being supplied with water at a different temperature. The cooling fluid in first pair of channels 72 and 74 is maintained at the lowest temperature, at least 150° F. below the extrudate temperature, so that the greatest temperature differential between the melt and the die lip occurs at the proximal side thereof. The temperature in the respective pairs of channels is increased in the machine direction, so that channels 72 and 74 are provided with circulating water at the lowest temperature, channels 76 and 78 are provided with circulating water at an intermediate temperature, and channels 80 and 82 are provided with circulating water at the highest temperature. The cooling liquid in channels 76 and 78 is maintained at a temperature at least 15° F. above the cooling liquid in channels 72 and 74. The cooling liquid in channels 80 and 82 is maintained at least 15° F. above the temperature of the cooling liquid in channels 76 and 78. Preferably the temperature increment between adjacent cooling zones is in the range from about 20° F. to about 30° F. The reason for increasing the temperature of the extended die lip in the downstream direction is to prevent excessive cooling of the foam sheet. The desired temperature effect upon the polystyrene melt, achieved by the extended die lip is to obtain a substantially linear temperature decrease within the cross-section of the melt as the melt progresses downstream along the extended die lip. However, an initial substantial temperature decrease is desired at the upstream face of the die lip proximate channels 72 and 74 to permit the rapid formation of a skin, and the consequent dimensional stabilization which the formation of the skin provides. The temperatures are then increased upstream, while maintained substantially below the temperature of the melt, so that although cooling occurs throughout the length of the extended die lip, it occurs at lesser rates as the foam sheet 70 progresses downstream along the die lip. This progressive increase in temperature along the die lip is extremely important to prevent any corrugation from forming in the sheet. In a T-die process extended die lip it is preferred that at least three discrete temperature cooling zones of increasing temperature be maintained, and more than three such zones may be utilized.

The spacers 64 maintain a gap in the range from about 5 mils to about 25 mils between the lower die lip 46 and extended die lip 60. The extended die lip is located somewhat below the upper surface of lower die lip 46. The vertical spacing between the upper surface of lower die lip 46 and the upstream edge of upper surface 66 of extended die lip 60 is in the range from about 5 to about 25 mils. The purpose of the insulating gap 62 between the lower die lip 46 and extended die lip 60 is to provide a relatively unheated and uncooled space in which the foam can commence its expansion without any of the negative effects of substantial cooling, and to provide insulation between the external and internal die lips. The vertical displacement of the proximal surface of extended die lip 60 below the upper surface of lower die lip 46 is to accommodate, without hindering, the vertical expansion which occurs when the foam exits the die lips 44 and 46, where it is under high pressure, and expands, as it enters the atmosphere, under the influence of the internal blowing gases entrapped within the closed cell polystyrene foam. A diagrammatic representation of the profile of the foam growth as it exits the die lip, can be seen in FIG. 3. The vertical spacing between the respective upper surfaces of die lip 46 and extended die lip 60 will depend upon the expected and desired expansion of the foam sheets being formed. To permit variations of the process to accommodate sheets of varying thickness, die lip 60 may be vertically adjustably mounted by providing suitable adjusting means (not shown). The particular spacing between die lip 46 and extended die lip 60 will depend upon the temperature at which the respective die lips are being maintained, the machine speed being utilized, and the particular foam composition being produced.

As can be best seen in FIG. 1, a pair of cooling rolls 84 and 86 are provided downstream of the die lip 60 to accomplish cooling of the sheet, and to complete setting of the sheet. The lower roll 86 will conventionally be maintained at 125° F. by a supply of circulating hot water or hot oil, and the upper roll 84 will conventionally be maintained at a temperature in the range between about 130° F. and 210° F.

Although the drawings show an air knife 90 utilized for the purpose of cooling the surface of the foam opposite the extended die lip, the use of the air knife is not always necessary or desirable. The air knife is particularly useful when it is desired to decrease the density of the foam being produced. However, since the air knife tends to produce a skin on the surface against which the air knife flow is directed, it may be preferred not to use the air knife if escape of volatiles is desired to eliminate odor problems. For example, in McConnell U.S. Pat. No. 3,199,757, there is shown a polystyrene cup comprising a laminate of polystyrene foam and solid polystyrene. If it is desired to produce such a cup it would be preferred to avoid the use of the air knife. It is to be noted that in the event that such a laminate construction is to be utilized in the formation of a cup, a roll of solid sheet material would be fed in contiguity with the warm sheet foam material downstream of the cooling rolls and a laminate would be formed which could then be formed by conventional deep draw techniques into cups. In such a process, it is desirable that the solid polystyrene sheet be the inner surface of the cup. However, that sheet may be laminated to either of the two faces of the polystyrene foam sheet.

In those instances in which it is desired to further lower the density of the polystyrene foam, it is desirable to utilize an air knife to provide a relatively thin skin upon the surface of the polystyrene foam opposite the extended die lip-contacting surface. In the T-die apparatus shown in FIG. 1, the air knife 90 constitutes a conduit 92 which is mounted by suitable supporting means (not shown) which may permit the air knife to be vertically and rotatably adjustable, and the air knife extends substantially across the entire transverse dimension of the extended die lip 60. The air knife is provided with a nozzle 94 having a predetermined exit gap, which, in combination with the pressure of the air within conduit 92, determines the velocity at which the air will exit the nozzle. The nozzle is also coextensive, in a tranverse direction, with extended die lip 60. The nozzle 94 is directed downward and toward the die lip, at an angle such that as little flow of air as possible will be directed toward the insulating gap 62, so that the temperature at the insulating gap will be as close to an unencumbered atmospheric temperature as can reasonably be obtained. It is desired that the effect of the air knife 90 be commenced at approximately the same point as the point at which the foam extrudate comes in contact with the proximate extremity of the upper face of extended die lip 60. Air supplied to air knife 90 is cooled to a temperature of at least 100° F. below the temperature of the extrudate, and the pressure of the air within conduit 92 will be up to 5 inches of water. In practice, the air will be desired to impinge upon the upper surface of the foam extrudate within between about 1 and 1.25 inches or less distance after the foam has exited from the die, but after the foam has passed beyond air gap 62.

Air knives of the sort shown schematically in FIG. 1 are commercially available and the specific details of the design of the air knife form no part of the invention. The particular conditions of the air knife operation, such as air knife pressure flow and temperature, insulating gap 62 distance, the step-down distance, and the temperature of the extended die lip, will depend upon the particular machine being utilized, the production rate, the extrudate temperature, and the particular resin mix being used. The particular details of control of these variables will be within the purview of the skilled artisan, given the conditions and limitations set forth herein. For example, in a preferred embodiment, an air pressure in the air knife of one inch of water, providing 193 cubic feet per minute of air, at an exit opening of 0.19 inch, may be utilized. Generally, 0.1 to 2 inches of water will be the desirable pressure of the air supplied in conduit 92. In the air knife, air at ambient temperature is usually preferred. However, cool air may be supplied if machine speeds are particularly high, or if it is desired to provide a more substantial upper skin. The effect of the air knife is to close cells at the surface of the foam sheet upon which the air from the air knife impinges. Some blowing gas will break through the surface skin produced by the air knife producing micropores in the surface skin.

Referring now to FIG. 4, there is seen a ring die 100, having an inlet conduit 102 through which the extrudate from the barrel of the extruder flows. Plug member 104 which has a substantially frusto-conical shape is located in transverse manifold opening 106 within the body of the die.

Outer collar 108 of the ring die is radially adjustable by means of adjusting screws 110, and plug 104 is longitudinally adjustable, so that the gap therebetween may be varied to regulate the thickness of the foam sheet being extruded.

It is to be noted that the temperature in the ring die will generally be maintained at approximately the melt temperature at the downstream end of the extruder, which may conventionally be on the order of 350° F. to 450° F. Also, because of the relatively lower temperatures at which ring die foams are extruded, less cooling of the ring die foams is necessary in order to accomplish setting of the foams. The die lip 108 of the ring die, at the downstream extremity, is provided with peripherally staggered insulating spacers 112, to space the die lips from the extended die lip unit 114. Extended die lip unit 114 is mounted to the die body by means of longitudinally adjustable screws 116, so that the longitudinal placement of the extended die lip may be regulated. The spacing between the extended die lip and the ring die lip is maintained by the spacers 112, and append to a 25 mil spacing therebetween if desired, the particular spacing utilized depending upon the machine speed in question. Because of the relatively lower temperature at which ring die foams are extruded, and the relatively lower (compared to T-die foam) linear sheet speeds at which sheets are extruded, the lengths of the extended die lip for the ring die is substantially less than the length of the extended die lip for the T-die. The extended die lip length with respect to ring die foam will be in the range from about ½ to about 3 inches, and will preferably be about 1½ inches long. On the other hand, the extended die lip for the T-die may be in the range from about 2 to about 12 inches in length. As is the case with the T-die extended die lip, the surface 118 of the ring die extended die lip, which comes in contact with the foam 120 (and which extends outwardly at an angle of about 60° from the horizontal) has a slight outward curvature, the radius of curvature being approximately 2 feet, so that the ring die foam as it expands on the mandrel 122, will be maintained in constant physical contact with the surface 118 of the extended die lip.

Extended die lip 114 is provided with an annular cooling channel 122 which is supplied, through conduit means (not shown), with a heated oil or water at a temperature in the range from about 80 to about 250° F. for the purpose of cooling the surface of the foam sheet which comes in contact with the die lip and permits the formation of the dense skin at that surface. Because of the relatively low temperature at which the ring die foam is extruded and the relatively low linear machine speeds, only one cooling channel is provided in the ring die lip. However, in the event that a temperature control gradient is desired along the ring die lip, two or more temperature conduits can be provided and different temperature zones maintained along the ring die lip. As the cylinder of ring die foam is blown, it passes over a toroidal conduit 130, which is provided with a multiplicity of spaced peripheral apertures 132, to supply cooling air, at a temperature at least 100° F. below the extrudate exit temperature, to the inner surface of the foam. Again, the cooling air will preferably be at room temperature although the air may be refrigerated if desired. In the instance of the ring die foam, the cooling air will most preferably be directed away from the die lips, so that the cooling air does not impinge upon the foam until a substantial distance after the foam has commenced to touch the extended die lip. The cooling air accomplishes the same result as with the T-die cooling air, namely to permit the formation of a relatively thin skin on the inner surface of the ring die foam. The ring die foam passes over an external mandrel 122 which accommodates the expansion of the ring die foam to a substantially greater diameter than the diameter of the extrudate at the die lip exit. After the ring die foam passes over the mandrel, which is provided with cooling water to accomplish a further cooling and setting of the foam, the foam is slit at diametrically opposed points, by conventional knife means (not shown), so that two semicylinders are formed, and these semicylinders are rolled, as flat sheets, onto wind-up rolls.

It will be appreciated that a wide variety of variations and permutations of the invention may be utilized without departing from the spirit and scope of the invention. For example, the wide variety of extruding machines, barrel diameters, operating pressures and temperatures, foam thicknesses, and the like will give rise to a wide variety of operating conditions in which the process of the instant invention is applicable.

What is claimed is:

1. A process for producing a sheet of deep-drawable polystyrene foam from polystyrene containing foaming agents therein, said method comprising the steps of:
    (a) heating said polystyrene to form a melt;
    (b) extruding a substantially flat sheet from said melt in a downstream direction from a substantially rectangular die orifice into an ambient region at substantially atmospheric pressure in which said sheet is free of engagement with rigid surfaces to permit unrestricted growth in thickness of said sheet for establishing the requisite uniformity in thickness and cellular structure to permit formation of deep-drawn articles therefrom;
    (c) controlling the temperature of said melt within said die orifice to aid in controlling said growth in thickness of said sheet;
    (d) contacting only one face of said sheet, after said unrestricted growth in thickness occurs, by a rigid surface having a length of at least two inches in the downstream direction, said rigid surface being positioned below said die orifice to establish the ambient region in which the sheet is unrestricted; and
    (e) substantially uniformly cooling the face of said sheet which contacts said rigid surface by maintaining said rigid surface at a lower temperature than said sheet, a first zone of said rigid surface which is initially contacted by said one face of said sheet being maintained at a temperature of at least 150° F. below the temperature of the melt exiting from the die orifice, whereby said rigid surface supports said sheet and permits substantially unhindered downstream flow of said sheet thereover to rigidize said sheet without distortion thereof and to form a densified cellular skin on said one face of said sheet for dimensionally stabilizing said sheet to sustain said requisite uniformity in thickness and cellular structure of said sheet.

2. The process according to claim 1, comprising the additional step of providing said rigid surface with a slight uniform convex curvature in the downstream direction for assuring that uniform contact occurs between said face of said foam and said rigid surface.

3. The process as set forth in claim 2, including the step of cooling the face of said foam which is opposed to the face which contacts the rigid surface by impinging an airstream against said opposed face at substantially the same downstream region at which the foam commences to be supported by said rigid surface.

4. The process according to claim 2, including the step of maintaining zones of said rigid surface downstream of said first zone at progressively higher temperatures than said first zone for cooling said sheet at a substantially linearly decreasing rate to prevent excessive cooling of said sheet.

5. A process for producing a sheet of deep-drawable polystyrene foam from polystyrene containing foaming agents therein, said method comprising the steps of:

(a) heating said polystyrene to form a melt;

(b) extruding a substantially tubular sheet from said melt in a downstream direction from an annular orifice of a die into an ambient region at substantially atmospheric pressure in which said sheet is free of engagement with rigid surfaces to permit unrestricted growth in thickness of said sheet for establishing the requisite uniformity in thickness and cellular structure to permit formation of deep-drawn article therefrom;

(c) contacting only the outer face of said sheet, after said unrestricted growth in thickness occurs, by a rigid surface having a length in the downstream direction of at least one-half inch, an annular transverse configuration and an outwardly directed concave curvature in the downstream direction, said rigid surface being spaced outwardly of said annular orifice in the cross-machine-direction to establish the ambient region in which the sheet is unrestricted; and (d) substantially uniformly cooling the outer face of said sheet by maintaining the rigid surface at a temperature of at least 150° F. below the temperature of the melt exiting from said annular orifice to permit substantially unhindered downstream flow of said sheet on said rigid surface to rigidize the foam without distortion thereof and to form a densified cellular skin on the outer face thereof for dimensionally stabilizing said sheet to sustain said requisite uniformity in thickness and cellular structure of said sheet;

(e) directing said tubular sheet over a cylindrical mandrel positioned downstream from the rigid surface to maintain the tubular configuration of said sheet; and (f) blowing an air stream against the inner face of the tubular sheet between the die and cylindrical mandrel.

References Cited
UNITED STATES PATENTS

| | | | |
|---|---|---|---|
| 3,431,164 | 3/1969 | Gilbert | 264—53 XR |
| 3,299,192 | 1/1967 | Lux | 264—48 XR |
| 3,311,681 | 3/1967 | Cherney et al. | 264—53 XR |
| 3,378,614 | 4/1968 | Overcashier | 264—51 |
| 3,560,600 | 2/1971 | Gliniecki | 264—48 |
| 3,239,881 | 3/1966 | Larsen | 264—51 |
| 3,444,283 | 5/1969 | Carlson | 264—53 |
| 3,624,192 | 11/1971 | McCoy et al. | 264—51 |

ROBERT F. WHITE, Friday Examiner

J. B. LOWE, Assistant Examiner

U.S. Cl. X.R.

264—176 R, 209, 237, Dig. 14, Dig. 69